United States Patent [19]

Ando et al.

[11] 4,027,102
[45] May 31, 1977

[54] VOICE VERSUS PULSED TONE SIGNAL DISCRIMINATION CIRCUIT

[75] Inventors: Shizuo Ando; Terumasa Shimizu, both of Kawagoe, Japan

[73] Assignee: Pioneer Electronic Corporation, Tokyo, Japan

[22] Filed: Nov. 25, 1975

[21] Appl. No.: 635,015

[30] Foreign Application Priority Data

Nov. 29, 1974 Japan .................. 49-143371[U]
Oct. 13, 1975 Japan .................. 50-139295[U]

[52] U.S. Cl. .................... 179/1 VC; 179/1 SC; 328/109; 179/84 VF
[51] Int. Cl.² ................................. H04M 3/22
[58] Field of Search .............. 179/1 SA, 1 SC, 1 D, 179/84 VF, 1 HF, 1 P, 1 VL, 1 VC, 1 MN, 15 AS, 6 E, 2 DP, 175.2 C; 340/171; 307/232; 328/109

[56] References Cited

UNITED STATES PATENTS

| | | | |
|---|---|---|---|
| 3,725,602 | 4/1973 | Hoffman | 179/1 HF |
| 3,767,860 | 10/1973 | Brown | 179/1 MN |
| 3,927,260 | 12/1975 | Amundson et al. | 179/1 MN |
| 3,949,177 | 4/1976 | Ball et al. | 179/84 VF |

OTHER PUBLICATIONS

Nassimbene, "Speech Analyzing Circuitry," IBM Tech. Disclosure Bull., vol. 6, No. 7, Dec., 1963.
Comer, Kawahara, "Speech Recognition Voicing Det.," IBM Disclosure Bull., vol. 16, No. 10, Mar., 1964.

Primary Examiner—Kathleen H. Claffy
Assistant Examiner—E. S. Kemeny
Attorney, Agent, or Firm—Sughrue, Rothwell, Mion, Zinn & Macpeak

[57] ABSTRACT

Two circuit embodiments are disclosed for discriminating between a voice signal and other audio standard (busy and dial tone) signals on a telephone line. One embodiment measures the frequency of the envelope of the audio signal and decides voice (speech) presence if (glottal) frequencies above 50 hz. are present. The second embodiment measures the cyclic frequency of the audio signal and decides voice (speech) presence if frequencies above 600 hz are present, assuming busy or dial tones are 400 hz. Features of the second embodiment include gating of the timer-counter to prevent the cycle-counter from erroneously counting chatter during rise-time and fall-time of an audio signal.

8 Claims, 2 Drawing Figures

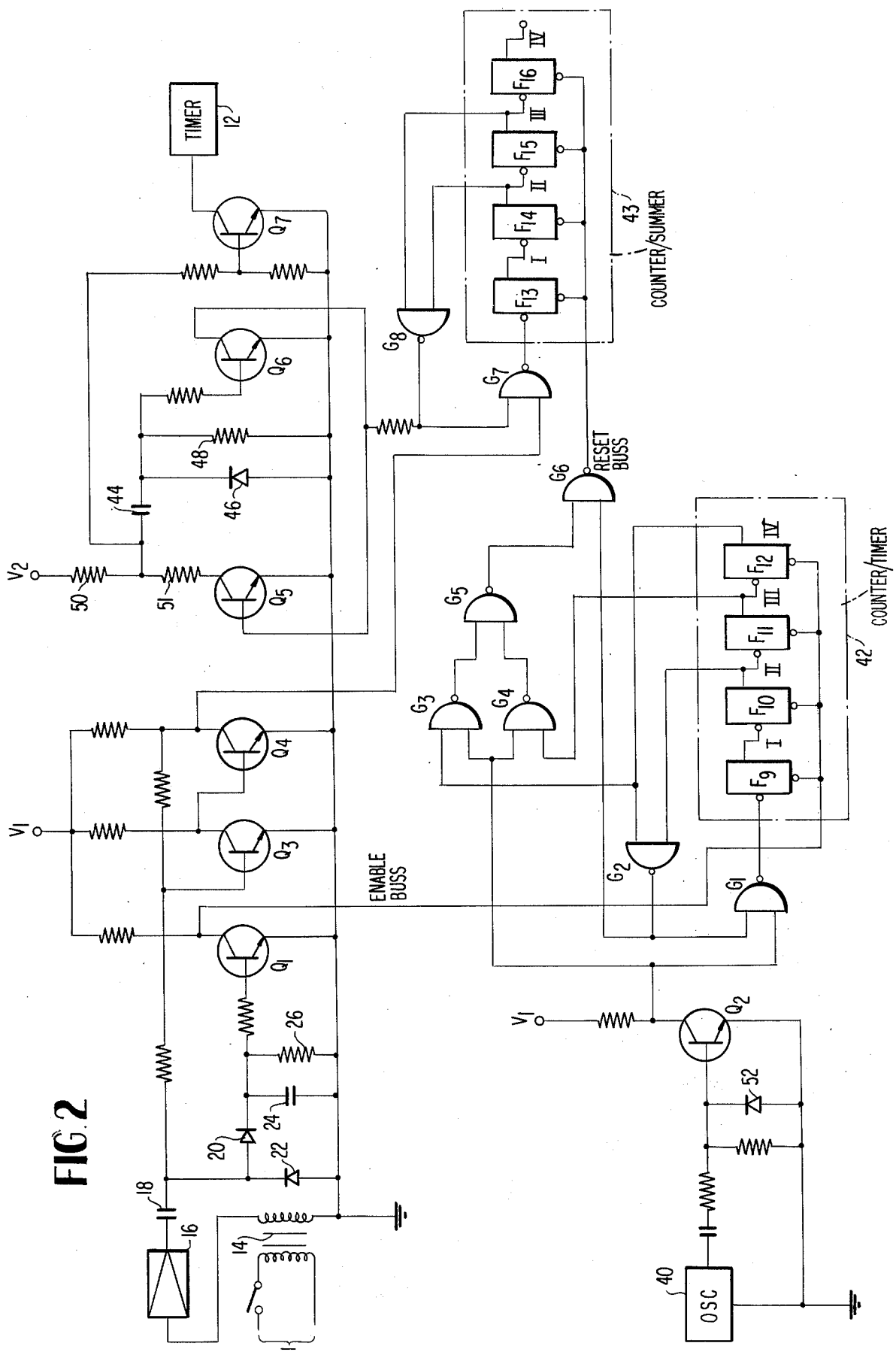

VOICE VERSUS PULSED TONE SIGNAL DISCRIMINATION CIRCUIT

BACKGROUND OF THE INVENTION

The present invention relates to apparatus for detecting the presence of voice signals on a telephone line or the like, and more particularly, is directed to a circuit for discriminating the existence of a voice signal on a telephone line from other signals, such as busy-tones, dial-tones, etc., normally occurring on a telephone line.

It is known in the prior art to provide signal discrimination circuits for discriminating one type of signal from other types of signals. In particular, such signal discrimination circuits are often used for detecting the existence of voice signals on a telephone line. Such apparatus has utility in automatic telephone response systems for restarting a timing mechanism in the automatic system. Such signal discriminating circuits also have other utilities as will be well understood by anyone of ordinary skill in the art.

The conventional method of discriminating voice signals from other common signals occurring on a telephone line is based upon a statistical feature of voice signals. That is, a voice signal will normally have a pause of 0.6 seconds or longer every few seconds. Thus, the conventional signal discriminator operates to detect the existence of such pauses. Problems exist, however, in adapting such discriminators for use with telephone lines in several different countries. Whereas a busy-tone signal in some countries will have pauses shorter than 0.6 seconds, in other countries the busy-tones will have pauses which are equal to or longer than 0.6 seconds. Obviously, the signal detector can be altered so as to detect longer pauses, thereby being insensitive to the occurrence of the busy-tone, but such adjustment must be made in a factory. Furthermore, if the discriminator is adjusted to detect pauses greater than 1 second, the effectiveness of the signal discriminator will be severely hampered.

SUMMARY OF THE INVENTION

It is therefore, an object of the present invention to provide a signal discriminator circuit which overcomes the defects and disadvantages mentioned above.

It is a further object of the present invention to provide a signal discriminator circuit which detects voice signals based upon a characteristic other than the statistically occurring pauses in the voice signals on telephone lines.

These and other objects of the invention are achieved by providing a circuit wherein a first counter provides a time period within which a second counter is enabled, said time period being adjustable merely by substituting an oscillator used in the circuit. The second counter is operative during said time period to count amplitude variations in the received voice signal. If a predetermined number of such variations are counted during said established time period, an output is provided indicating the present voice signal.

In accordance with one embodiment, the input signal is applied to an envelope detector which provides a signal that varies with the peak amplitudes of the input signal. The variation of the envelope signal is then counted during the pre-established time period. In a second embodiment, the cycles of the input signal are counted during a pre-established time period, but the time period is too short to detect a busy-tone signal or a dial-tone signal.

BRIEF DESCRIPTION OF THE DRAWINGS

FIG. 2 is a partially block and partially schematic diagram of a second embodiment of the present invention.

DETAILED DESCRIPTION OF THE INVENTION

Figure 1:
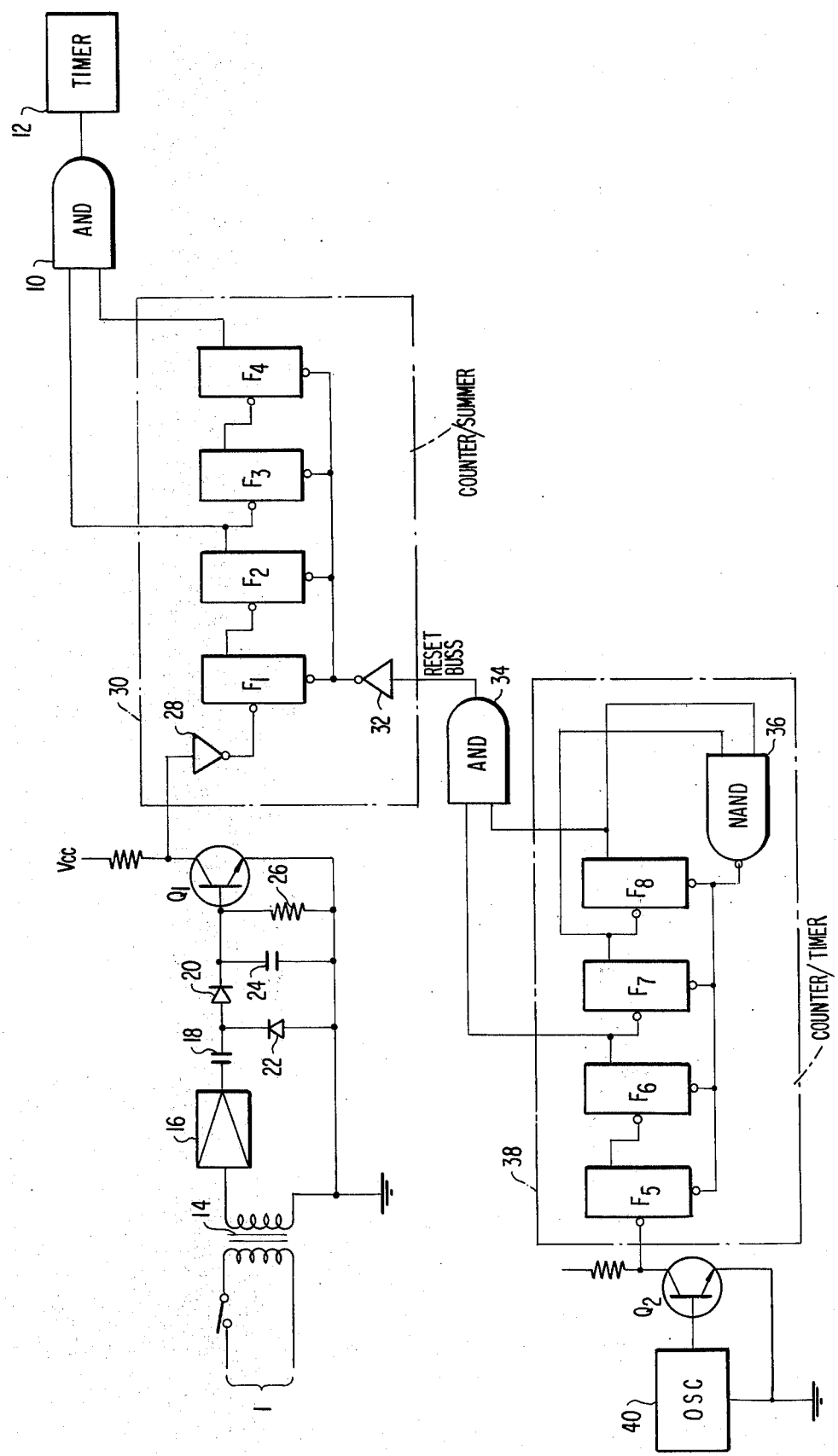
FIG. 1 is a partially block and partially schematic diagram of a first embodiment of the present invention.

Referring now to FIG. 1 a signal discriminator is shown which operates to detect the existence of an audio signal on the telephone line 1 and, in response thereto, provide an output signal at the output terminal of AND gate 10. For the purpose of illustration only, the output signal is indicated as being applied to a timer 12, such as a timer which is used in an automatic telephone response device. The timer operates to control a utilization means, and the occurrence of an output signal from AND gate 10 will operate to restart the timing sequence of the timer. As pointed out previously, the particular operation and function of the timer is not a feature of the present invention.

The embodiment includes a coupling mechanism 14, such as a transformer, for coupling the signals on telephone line 1 into the signal discriminator circuitry, amplifier 16, capacitor 18, a rectifier comprising diodes 20 and 22, a smoothing circuit or envelope detector comprising capacitor 24 and resistor 26, transistor $Q_1$, first counter 30, second counter 38 connected as a hexadecimal counter, transistor $Q_2$, oscillator 40, and second AND gate 34.

The oscillator 40 generates a control signal having a frequency of 50 to 100 Hz. As an example, it will be assumed that the oscillator generates a signal at 50 Hz. The output from the oscillator is applied to the base of transistor $Q_2$ having a collector connected to the input of the first stage $F_5$ of the hexadecimal counter 38. The counter 38 comprises four stages $F_5$ through $F_8$ and a single NAND gate 36. The stages operate in normal binary fashion. The NAND gate has inputs which are connected to the outputs of the third and fourth stages, $F_7$ and $F_8$. The output of NAND gate 36 is connected to the reset terminals of each of the stages $F_5$ through $F_8$. Consequently, when counter 38 reaches a count of 12, it is reset via NAND gate 36. Therefore, assuming a 50 Hz signal from oscillator 40, the recycle period of counter 38 will be 0.24 seconds (1/50 × 12).

The AND gate 34 has inputs connected to the outputs of stages $F_6$ and $F_8$ of counter 38, and the output from AND gate 34 is connected via INVERT gate 32 to the reset inputs of stages $F_1$ to $F_4$ of the first counter 30. Thus, the first counter 30 receives a reset signal every 0.24 seconds.

The time period mentioned above, i.e., 0.24 seconds, is established by selection of the frequency of oscillator 40 and is chosen because it provides a time period during which a certain characteristic, described below, of audio signals may be detected whereas busy-tones, dial-tones, etc., will not be detected.

When an audio signal appears on line 1, it is coupled into the signal discriminator via transformer 14, and then applied through amplifier 16, capacitor 18 and the rectifier circuit to the smoothing circuit comprising capacitor 24 and resistor 26. The capacitor and resistor values of the smoothing circuit are selected to follow the peaks of an audio frequency. Therefore, the signal appearing at the base of $Q_1$ will vary substantially with the peaks of the audio signal and will have the characteristic of an envelope signal. Since the level of a voice signal varies randomly, the peak envelope will vary randomly, and therefore the transistor $Q_1$ will be switched between the on and off states randomly. Statistically, the variation in level of the peak envelope cause the transistor $Q_1$ to switch more than 10 times during a period of approximately 0.2 seconds. The latter feature is the certain characteristic referred to above. Thus, since the switching of transistor $Q_1$ causes an impulse to be counted by the counter 30, and further because of the aforementioned random nature of the level of an audio signal, the counter 30 will count at least up to ten during the pre-established time period of 0.24 seconds. When the counter 30 reaches a count of ten, the outputs from stages $F_2$ and $F_4$ will cause AND gate 10 to provide an output indicating the presence of an audio signal on the telephone line 1. On the other hand, the amplitude of the dial-tone and the busy-tone signals is constant so that transistor $Q_1$ will not be switched 10 times during the pre-established time period. Also, even though the busy-tone signal is an intermittant signal, the repetitions occur at a very low frequency, e.g., 1 to 10 Hz. Consequently, even the repetitions will not cause transistor $Q_1$ to switch fast enough to enable counter 30 to reach a count of ten.

Although the system shown in FIG. 1 is reliable in most cases, there is a possibility that a false detection of audio can be obtained resulting from chattering occurring at the rise time or fall time of the dial-tone and busy-tone signals. Such chattering could result in multiple switching of transistor $Q_1$ at a sufficiently rapid rate to cause counter 30 to reach a count of ten. An embodiment of the invention which does not suffer from the latter is illustrated in FIG. 2 wherein identical elements shown in FIGS. 1 and 2 are identified by the same numbers.

In the embodiment of FIG. 2, the pre-established time period, during which the cycles are counted, is not started until a predetermined time following the initiation of any signal on line 1. In other words, for example, the counting time period will not start until approximately one tenth of a second following the initiation of an audio signal or a dial-tone signal, etc. Also, in the embodiment shown, each cycle of the audio frequency is counted by the counter, and therefore the counting time period is substantially less than that provided in the first embodiment. The counter for establishing the fixed time period is shown at 42 and the counter for counting the cycles is shown at 43. The audio signal, after being rectified and smoothed, is applied via transistor $Q_1$ to the reset input of counter 42 whereas the audio frequency is applied substantially via transistors $Q_3$ and $Q_4$ and NAND gate $G_7$ to the counting input of counter 43. In general, the device operates as follows.

Oscillator 40 in combination with transistor $Q_2$ and associated circuitry provides counting impulses to the counter 42. The counter 42, is enabled only when a signal appears on line 1 because of the connection between the collector of $Q_1$ and the reset input of transistor 42. A plurality of NAND gates $G_2$ through $G_6$ provide controls between these stages $F_9$ through $F_{10}$ counter 42 and the reset input of stages $F_{13}$ through $F_{16}$ of 43. Counter 43 is normally in a reset or disabled condition and is held in that condition until counter 42 reaches a count of four. During the time the counter 42 counts from four to ten, impulses from the collector of $Q_2$ pass through the NAND gates to alternatively enable and disable counter 43. As a consequence each individual time period of an enablement of counter 43 is equal to one half the pulse repetition period of oscillator 40. In other words, if oscillator 40 provides in output at 60 Hz (corresponding to a pulse repetition period of 1/60 seconds) then each time period of enablement of counter 43 has a duration equal to 1/120 seconds or 0.008 seconds. It will also be noted, that inasmuch as counter 42 is not enabled until a signal first appears on line 1, and furthermore, inasmuch as counter 43 is not enabled until counter 42 reaches a count of four, there is a time period, equal to three cycles of the oscillator 40, during which the cycles of the incoming audio or dial-tone signal are not accumulated by counter 43. This then provides the rise time protection mentioned above wherein the possible chattering during the rise time of a busy-tone or dial-tone signal will not be accumulated by counter 43.

It will be noted that the cycles of the audio, and also the dial-tone, will result in pulses appearing at the collector of $Q_4$, which pulses will pass through NAND gate $G_7$ so long as the output of NAND gate $G_8$ is high. If six such pulses appear during a single enabling time period (0.008 seconds) the outputs of stages $F_{14}$ and $F_{15}$ will go high causing the output of NAND gate $G_8$ to go low. The latter output thereby blocks NAND gate $G_7$ from passing therethrough any further impulses to the counter 43. Therefore, the output at $G_8$ will be held low until subsequent disabling of the counter stages via their reset input terminals.

When the output $G_8$ is high, which is the normal condition, transistor $Q_5$ is conducting, the junction of collector resistors 50 and 51 is at a low potential, and therefore transistors $Q_6$ and $Q_7$ will be cut off. The collector of $Q_7$, which represents the output of the signal discriminator circuit, will be high, indicating the absence of the detection of an audio signal. When an audio signal is detected by the operation of counter 43, the output from NAND gate $G_8$ goes low as previously described. As a result, transistor $Q_5$ cuts off and the junction of resistors 50 and 51 immediately rises to turn on transistors $Q_6$ and $Q_7$. The collector output of $Q_7$ drops to a low value, substantially zero volts, indicating detection of an audio signal. When transistor $Q_6$ turns on, as previously described above, its collector output holds transistor $Q_5$ in the off condition until the charge on capacitor 44 discharges via resistor 48. The time constant of capacitor 44 and 48 is set to be approximately 0.5 seconds for the purpose of insuring that $Q_5$ will be held in the off condition and $Q_7$ will be held in the on condition for the latter period of time.

A detailed explanation of the manner in which the time determining counter 42 controls the enabling and disenabling of the counter 43 will now be described. Initially, when no signal appears on line 1, transistor $Q_1$ is cut off and the collector of transistor $Q_1$ is high. Consequently, stages $F_9$ through $F_{12}$ of counter 42 will be in the reset condition and will not accumulate any of the pulses appearing at the collector of $Q_2$. Additionally, since the outputs of $F_{10}$ and $F_{12}$ are low, the output of NAND gate $G_2$ will be high thereby permitting the pulses at the collector of $Q_2$ to pass through NAND gate $G_1$.

As soon as a signal appears on telephone line 1, transistor $Q_1$ will turn thereby removing the disabling high level voltage from the reset input terminals of stages $F_9$ through $F_{12}$. The pulses at the collector of $Q_2$ (60 cycles in the particular example being described) will pass through $G_1$ and be accumulated by the counter 42.

The pulses at the collector of transistor $Q_2$ are also applied to NAND gates $G_3$ and $G_4$. However, since NAND gates $G_3$ and $G_4$ are connected respectively to the stages $F_{12}$ and $F_{11}$, and inasmuch as the outputs of those stages are at low levels at this time, the pulses will not pass thorugh NAND gates $G_3$ and $G_4$. The output of NAND gate $G_5$ will be low and the output of NAND gate $G_6$ will be held at a high level causing counter 43 to be disabled. During the first three counts accumulated by counter 42 there is no change in the NAND gate output conditions, and the output from $G_6$ remains a high level disabling output. However, when counter 42 accumulates its fourth count, stage $F_{11}$ provides a high level output which remains high until a count of eight is reached. When the counter reaches a count of eight, the output of $F_{12}$ becomes high and remains high until the counter is reset, as will hereinafter be explained. Thus, between the count of four and the time of reset, one of the NAND gates $G_3$ and $G_4$ will be enabled to pass the $Q_2$ collector pulses therethrough to NAND gate $G_5$. The pulses pass through NAND gates $G_5$ and $G_6$. Consequently, during this period of time, the pulses from the collector of $Q_2$, having a repetition rate of 60 pulses per second and pulse duration of 1/120 seconds, appear the output of $G_6$. When the counter reaches a count of ten, both inputs to NAND gate $G_2$ become high thereby causing $G_2$ to provide a low level output which effectively disables gate $G_1$ and stops the counter from counting past ten. The counter will be thus held at the count of ten until it is reset by the transistor $Q_1$ turning off. However, during the time that counter 42 is held at a count of ten, the counter 43 does not continue to receive enabling and disabling pulses because the output of NAND gate $G_2$ also functions to disable NAND gate $G_6$.

Thus, summarizing the above operation, as counter 42 counts from one to three, the counter 43 is fully disabled, and as counter 42 counts from four through ten, the counter 43 receives six enabling pulses, each having a duration of 1/120 seconds (it is assumed the signal from oscillator 40 has a 50 percent duty cycle).

If, during any of the very brief enabling time periods, the counter 43 accumulates six counts, transistor $Q_7$ will be turned on as previously described to indicate the existence of an audio signal on telephone line 1. Inasmuch as dial-tone and busy-tone signals have a frequency of 400 Hz, such signals will not cause six pulses to be accumulated by counter 43 during the very brief enabling period. Chattering at the rise time of the latter signals will not be accumulated by counter 43 because during the rise time of any signal the counter 43 will be disabled. Additionally, any chattering resulting from the fall time of a busy-signal or dial-tone will also not be counted because during that time the counter 42 will be held at a count of ten, thereby disabling gate $G_6$ and concomittantly disabling counter 43.

What is claimed is:

1. A voice signal discriminating circuit for discriminating a voice signal on a line from standard busy signals and dial tones on said line, said circuit comprising,
    envelope signal generating means responsive to audio frequency signals on said line for generating peak envelope signals having an amplitude which follows the peak amplitude of said audio frequency signals,
    switching means responsive to variations in the amplitude of said peak envelope signal for switching between a first stage and a second state in response to cyclic variations of the amplitude of said peak envelope signal,
    counter summation means connected to said switching means for counting, when enabled, the number of cyclic switchings of said switching means,
    time period control means for enabling and resetting said counter summation means for pre-established time periods, and
    output means connected to said counter summation means for producing an indication at the output thereof, signifying that a voice signal is on said line, when the count accumulated by said counter summation means reaches a predetermined number.

2. A voice signal discriminating circuit as claimed in claim 1 wherein said signal time period control means, comprises, a counter timer having a plurality of stages for registering the number of pulses counted thereby and pulse generating means connected to said counter timer for applying pulses to an input thereof.

3. A voice signal discriminator circuit as claimed in claim 2, wherein said envelope signal generating means comprises,
    a coupling means for coupling signals on said line into said discriminator circuit,
    means for rectifying the signals coupled into said circuit to provide rectified signals,
    smoothing circuit means for following the peaks of audio frequency signals applied thereto, and
    said rectified signals applied to said smoothing circuit means to provide an output signal which has an amplitude which substantially follows the peak amplitude of said rectified signals.

4. A voice signal discriminator circuit as claimed in claim 3 wherein said counter summer comprises,
    a plurality of counting stages, each having a reset-/enabling terminal.

5. A voice signal discriminator circuit as claimed in claim 4 wherein said time period control means further comprises logic circuit means, connected between the output terminals of stages of said counter timer and the reset/enabling terminals of the stages of said counter summer, for controlling the enablement and resetting of said counter summer in dependence upon the count in said pulse counter.

6. A voice signal discriminating circuit for discriminating a voice signal on a line from standard busy signals and dial tones on said line, said circuit comprising,
    counter summation means for counting, when enabled, the number of cycles of any audio signal coupled thereto, said counter summation means comprising a plurality of counting stages, each having a reset/enablement terminal,
    coupling means for connecting audio signals on said line to said counter summation means,
    smoothing and rectifying circuit means connected to said coupling means for generating an actuating control signal when an audio signal is on said line, and
    time period control means connected to said smoothing and rectifying circuit means and to said counter summation means for enabling said counter summation means for a predetermined period which begins a fixed period after initiation of said actuating control signal, said fixed period being long enough to prevent enablement of said counter summation means during the rise time of a busy signal and dial tone, and output means connected to said counter summation means for producing an indication at the output thereof, signifying that a voice signal is on said line, when the count accumulated by said counter summation means reaches a predetermined number.

7. A voice signal discriminating circuit as claimed in claim 6 wherein said time period control means comprises,
a pulse counter, having a plurality of stages, for counting pulses applied thereto,
pulse generating means for generating a series of pulses,
logic circuit means, connected between the outputs of stages of said pulse counter and the reset/enabling terminals of the stages of said counter summation means, for holding said counter summation means reset when said pulse counter is disabled, during a first predetermined number of initial counts of said pulse counter, and after a second predetermined number of counts of said pulse counter, and for alternatively enabling and resetting said counter summation means during said second predetermined number of counts of said pulse counter.

8. A voice signal discriminating circuit as claimed in claim 7 wherein said logic means is also connected to said pulse generating means and wherein the duration of said pulses from said pulse generating means determines the duration of continuous enablement of said counter summation means.

* * * * *